United States Patent
Amblard et al.

(10) Patent No.: US 11,286,430 B2
(45) Date of Patent: Mar. 29, 2022

(54) DEVICE FOR GAS-LIQUID SEPARATION, INTENDED FOR THREE-PHASE FLUIDISED BED REACTORS SUCH AS THOSE USED IN THE H-OIL PROCESS

(71) Applicant: IFP Energies Nouvelles, Rueil-Malmaison (FR)

(72) Inventors: Benjamin Amblard, Lyons (FR); Daniel Ferre, Saint Cyr sur Rhone (FR); Jean-Francois Le Coz, Saint Germain en Laye (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 37 days.

(21) Appl. No.: 16/348,222

(22) PCT Filed: Oct. 31, 2017

(86) PCT No.: PCT/EP2017/077847
§ 371 (c)(1),
(2) Date: May 8, 2019

(87) PCT Pub. No.: WO2018/086957
PCT Pub. Date: May 17, 2018

(65) Prior Publication Data
US 2019/0270941 A1  Sep. 5, 2019

(30) Foreign Application Priority Data
Nov. 9, 2016 (FR) ........................... 1660834

(51) Int. Cl.
*C10G 49/22* (2006.01)
*B01D 19/00* (2006.01)
*B01J 8/22* (2006.01)
*C10G 47/30* (2006.01)
*B01D 17/00* (2006.01)

(52) U.S. Cl.
CPC ............. *C10G 49/22* (2013.01); *B01D 17/00* (2013.01); *B01D 19/0042* (2013.01); *B01D 19/0052* (2013.01); *B01J 8/22* (2013.01); *C10G 47/30* (2013.01); *B01J 2208/00991* (2013.01); *C10G 2300/1074* (2013.01); *C10G 2300/1077* (2013.01)

(58) Field of Classification Search
CPC . C10G 49/22; C10G 47/30; B01J 8/22; B01D 19/00; B01D 19/0042
See application file for complete search history.

(56) References Cited

U.S. PATENT DOCUMENTS 4,886,644 A    12/1989  Chan et al.
5,624,642 A *  4/1997  Devanathan ............... B01J 8/22
                                                    422/140

FOREIGN PATENT DOCUMENTS

EP         0428796 A1    5/1991

OTHER PUBLICATIONS

International Search Report dated Dec. 19, 2017 issued in corresponding PCT/EP2017/077847 application (2 pages).

* cited by examiner

*Primary Examiner* — Youngsul Jeong
(74) *Attorney, Agent, or Firm* — Millen White Zelano and Branigan, PC; Csaba Henter

(57) ABSTRACT

A device for gas-liquid separation, intended to equip three-phase fluidized bed reactors such as those used in the H-oil process. The device has a succession of two bends situated in different planes, which device accomplishes excellent separation of the gas and of the liquid.

20 Claims, 4 Drawing Sheets

DEVICE FOR GAS-LIQUID SEPARATION, INTENDED FOR THREE-PHASE FLUIDISED BED REACTORS SUCH AS THOSE USED IN THE H-OIL PROCESS

CONTEXT OF THE INVENTION

The invention consists in improving the sizing of the upper part of the gas-liquid-solid reactors used in the H-oil process in order to obtain better gas/liquid separation in said upper zone often referred to as the "recycle cup". The term "recycle cup" is the specialist term used for what in this document will be referred to as the liquid recycling zone or, more simply, the recycle zone. The term "spiral riser" is the term often used for what in this document will be referred to as the gas/liquid separation device.

The H-oil process is a process for the hydroconversion of heavy hydrocarbon fractions, of the residue or vacuum gas oil type, which therefore brings together the liquid hydrocarbon phase, the hydrogen gas phase dispersed in the form of bubbles, and the catalyst itself dispersed in the form of particles with a particle size typically comprised between 0.2 and 2 millimeters.

The H-oil process is therefore a three-phase fluidized process which uses a special-purpose reactor, said reactor being equipped with a gas-liquid separation device situated in the upper part of the reactor so as to allow the recycling of the liquid which is returned after separation in the reaction zone of the reactor. One of the significant features of reactors of the H-oil type is their liquid recycle rate defined as being the ratio of the flow rate of recycled liquid to the flow rate of incoming liquid feedstock, and which generally lies in the range of 1 to 10.

The present invention can be defined as being an improved gas-liquid separation device for reactors of the H-oil type that allows the majority of the liquid to be reintroduced without gas into the reaction zone, with the gas (which may still contain a minority of liquid) being removed out of the reactor.

The present device makes it possible to achieve gas/liquid separation efficiencies that are higher than that of the "spiral risers" of the prior art.

The gas-solid separation devices are indicated by the elements (27) and (28), some elements having their lower end situated in the zone (29), while other elements have their lower end situated on the conical surface of the "recycle cup" (39). It is these separation elements that form the subject of the present invention, the rest of the reactor remaining unchanged in comparison with the prior art.

Figure 2:
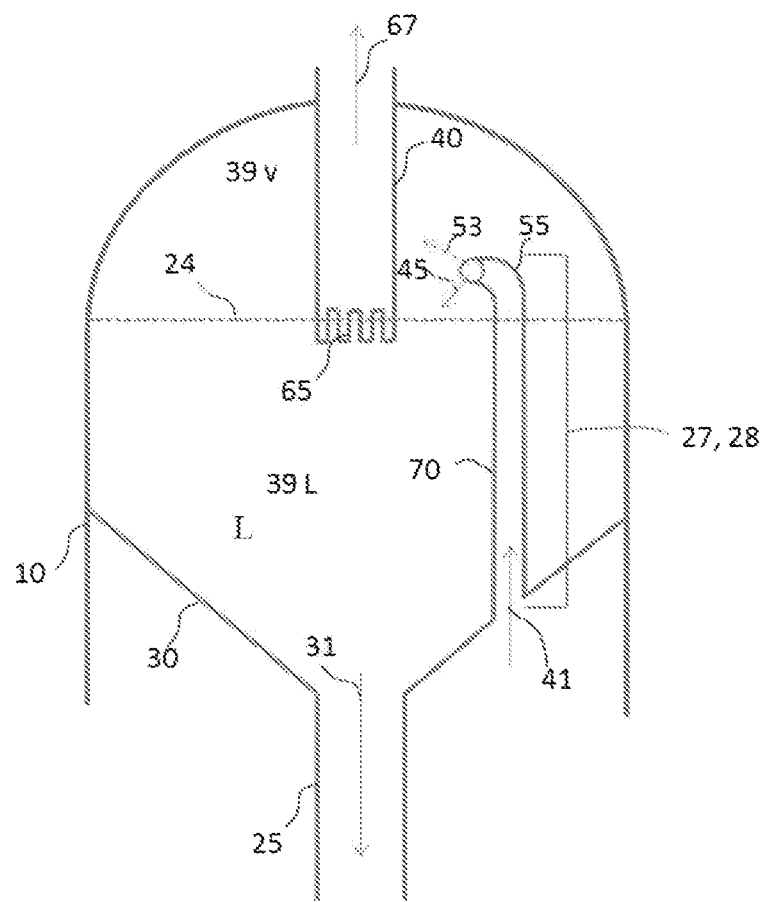

FIG. 2 is a more detailed schematic view of the upper part of the reactor referred to as the liquid recycling zone because it ends in an internal pipe (25) which, after gas/liquid separation, returns the liquid to the lower part of the reactor via the recirculation pump (20). The gas-liquid separation devices (27) and (28) are installed along the conical surface (30) of the recycle zone. The gas/liquid mixture is admitted via the pipes (70). Gas/liquid separation takes place in the devices (55). Each separation device (55) therefore consists in the tubular inlet element that admits the gas-liquid mixture (70), ending in the succession of two bends situated in two distinct planes:

the first plane denoted (yz) is perpendicular to the x-axis, the second plane denoted (xy) is perpendicular to the z-axis.

There is no elevation in the vertical direction at the transition between the two successive bends. The vertical measurement (along the z-axis) of the first bend, and the vertical measurement (along the z-axis) of the second bend are substantially the same. What is meant by substantially is a vertical offset that does not exceed the value D of the diameter of the gas-liquid mixture inlet pipe (70).

The liquid flowing after leaving the separation elements along the conical wall (30) is collected by the outlet downpipe (25), and the gas is removed by the outlet of the second bend of each separation element (27) and (28). The gas therefore occupies the upper end (39v) of the separation zone (39) situated above the gas-liquid interface (24) and leaves the reactor via the outlet pipe (67).

Figure 3:
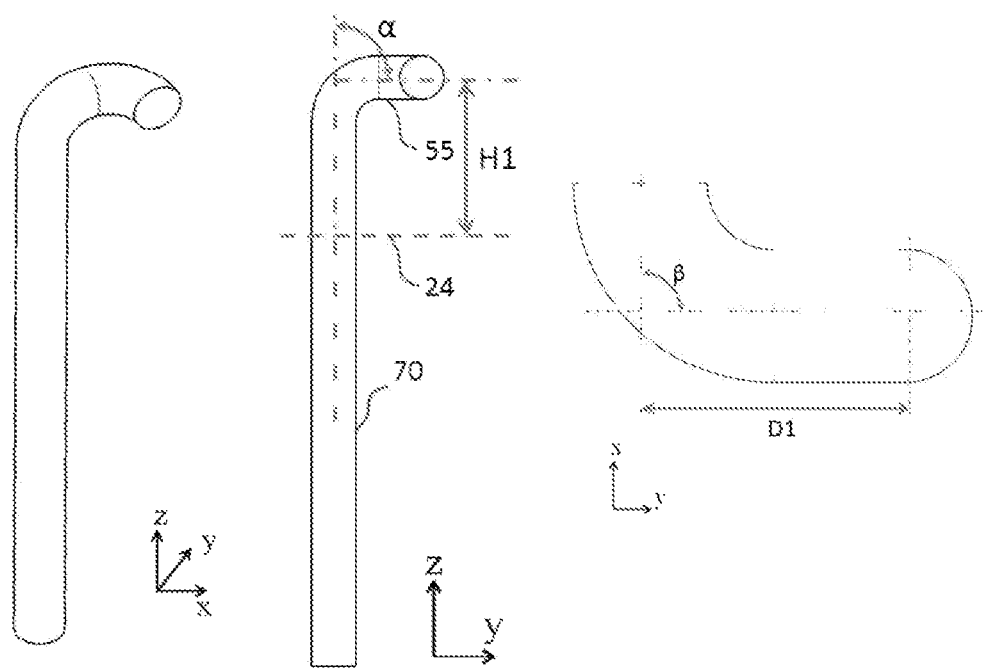

FIG. 3 bears information allowing the dimensioning of the separation devices (27) and (28) according to the invention. The angle alpha of the first bend and the angle beta of the second bend, as well as the distance D1 separating the two successive bends will be noted in particular.

Figure 4:
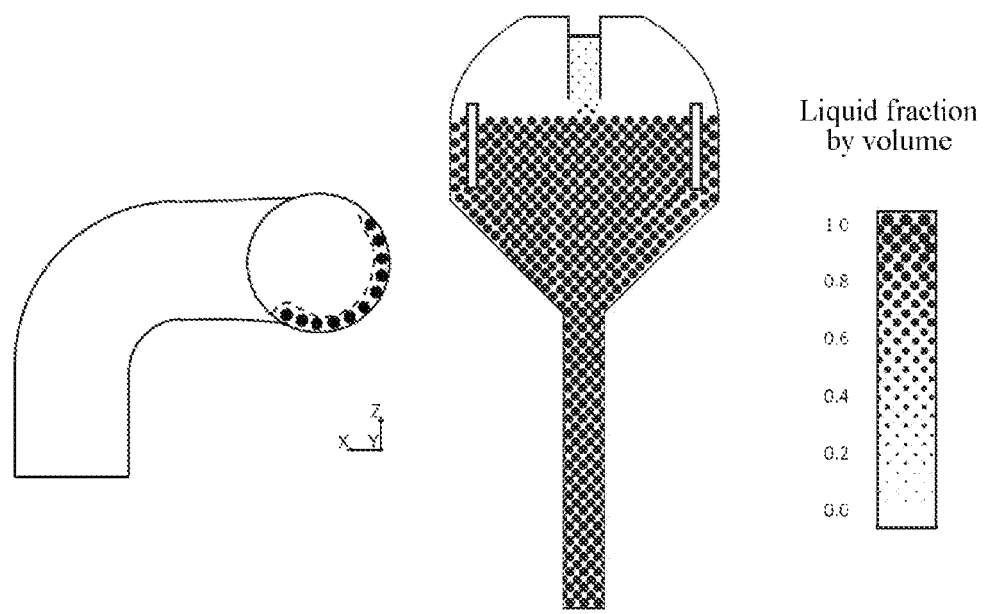

FIG. 4 is a visual depiction of the gas-liquid separation efficiency, resulting from a 3D simulation performed using the Fluent™ software package. This simulation relates to the outlet of the separation device and to the entirety of the recycle zone. It makes it possible to see, using shades of gray, the presence of the gas, in pale gray, and the location of the liquid, in dark gray. The darker the shade of gray, the greater the presence of liquid.

EXAMINATION OF THE PRIOR ART

An examination of the prior art in the field of gas-liquid separation in three-phase reactors of the H-oil type reveals document U.S. Pat. No. 4,886,644, which is briefly analyzed below:

U.S. Pat. No. 4,886,644, which can be considered to be the closest prior art, describes the concept of "spiral risers" in the H-oil process.

The main claims relate to the design of the "spiral risers" (the number of turns of the spiral and the angle with respect to the horizontal).

The "recycle cup" described in the cited text corresponds to the upper part of the reactor which, after separation of the gas and of the liquid, allows the liquid to return to the reaction zone of the reactor and the gas to be removed by a dedicated pipe.

In the remainder of the text the expression upper liquid recycle zone or, more simply, recycle zone, will be used to refer to the "recycle cup".

Document U.S. Pat. No. 4,886,644 also discloses an arrangement of the upper recycle zone which combines the gas/liquid removal pipe at the top of the reactor with a hydrocyclone.

BRIEF DESCRIPTION OF THE INVENTION

The present invention may be defined as being a gas-liquid separation device installed in the recycle zone of the three-phase fluidized reactors used in processes for the hydroconversion of heavy hydrocarbon fractions in the presence of hydrogen under high pressure, which process we shall refer to as a process of the H-oil type. In fact, the present device can be used in any type of three-phase fluidized bed reactor that has need of gas-liquid separation.

What is to be understood by the expression three-phase fluidized bed process is a process in which three phases are present in the reaction zone: a liquid phase, generally constituting the feedstock that is to be processed; a gas phase under high pressure, generally hydrogen;

and a solid phase corresponding to the catalyst divided into solid particles, usually of a diameter comprised between 0.2 and 2 mm, and preferably comprised between 0.7 and 1.5 mm.

The separation device according to the present invention consists in a plurality of separation elements (27) and (28) operating in parallel and installed vertically from the conical surface (30) of the recycle zone (39).

The recycle zone (39) can be broken down into an upper part (39 v) corresponding to the gas, and into a lower part (39 L) corresponding to the liquid. During operation, these two zones are separated by a gas-liquid interface (24).

Each separation element (27) and (28) ends in a succession of two bends:
a first bend situated in the plane (z,y), followed by a second bend situated in the plane (x,y).

The first bend in the (yz) plane has its orientation defined by its angle α comprised between 45 and 315°, preferably between 60° and 300°, and, as a preference, between 80° and 200°.

The second bend in the (xy) plane has its orientation defined by its angle β comprised between 0° and 135°, preferably between 10° and 110°, and, as a preference, between 30° and 100°.

The z-axis corresponds to the vertical axis and the (xy) plane is the plane perpendicular to the z-axis, namely a plane that is substantially horizontal.

These two successive bends are separated by a distance D1 comprised between D/2 and 4D and preferably comprised between D/2 and 2D, D being the diameter of the pipe (70).

In the gas-liquid separation device according to the present invention, the density of the separation elements (27) and (28) is generally comprised between 5 and 70 units per m2 of empty barrel reactor surface area.

The present invention may also be defined as being a process for the three-phase fluidized bed hydroconversion of heavy hydrocarbon fractions using the gas-liquid separation device according to the characteristics given above, which process operates under the following operating conditions:
an absolute pressure comprised between 2 and 35 MPa, preferably between 5 and 25 MPa, and more preferably still, between 6 and 20 MPa,
a temperature comprised between 300° C. and 550° C., preferably comprised between 350 and 500° C., and more preferably still, comprised between 370 and 430° C., the favored temperature range lying between 380° C. and 430° C.,
the surface velocity of the upflow considered inside each inlet pipe (70) is generally comprised between 0.1 and 20 m/s, preferably between 0.2 and 15 m/s, and more preferably still, comprised between 0.3 and 10 m/s.

DETAILED DESCRIPTION OF THE INVENTION

Figure 1:
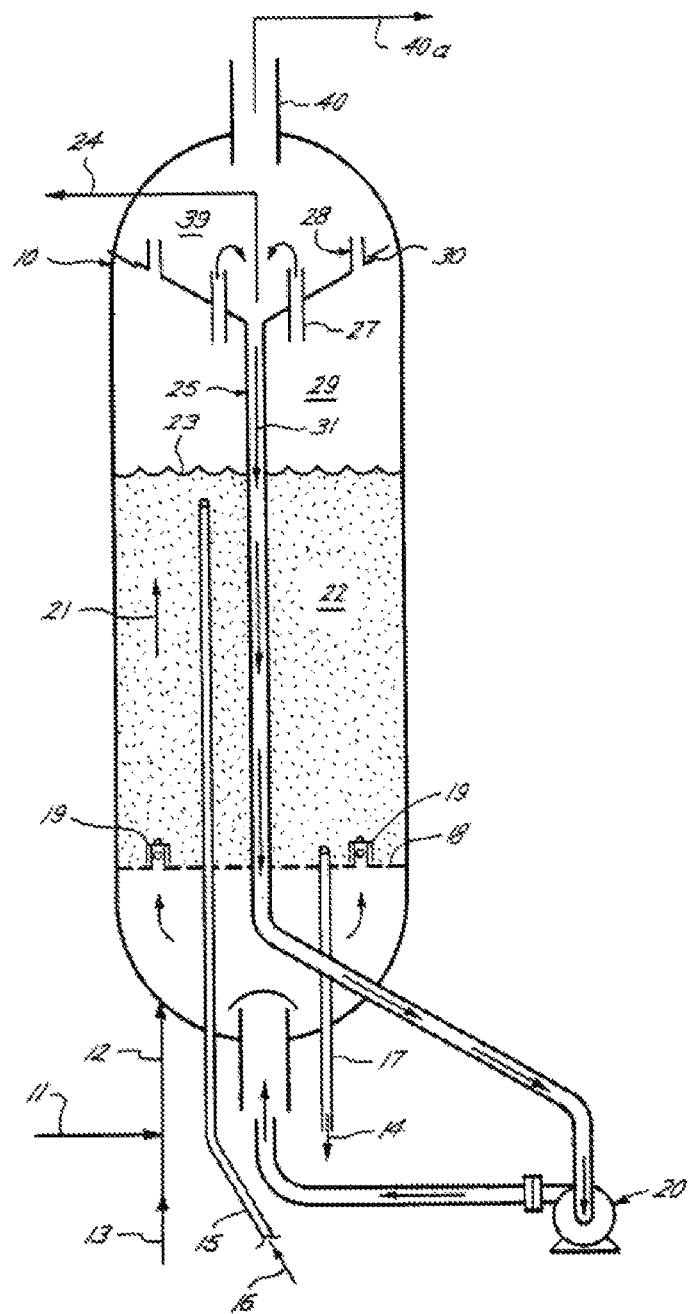
FIG. 1 according to the prior art depicts a diagram of a three-phase fluidized bed reactor used in the H-oil process. This figure shows the reaction zone (22) corresponding to the three-phase fluidized bed containing the catalyst, the zone situated above the catalytic zone and referred to as the gas-liquid separation zone (29) which allows the liquid to be recycled to the lower part of the reactor by means of the recirculation pump (20).

For a full understanding of the invention it is necessary to briefly describe the operation of a reactor of the H-oil type, as depicted in FIG. 1 according to the prior art.

FIG. 1 is an indicative diagram showing the key elements of an H-oil reactor according to the prior art. This reactor is specially designed with suitable materials that allow it to process reactive liquids, liquid-solid slurries (which is to say liquids containing fine particles of solid dispersed within them), solids and gases at high temperatures and pressures with a preferred application to the treatment of liquid hydrocarbon fractions with hydrogen at a high temperature and high pressure, which is to say at an absolute pressure comprised between 2 and 35 MPa, preferably between 5 and 25 MPa, and more preferably still, between 6 and 20 MPa, and at a temperature comprised between 300° C. and 550° C., preferably comprised between 350° C. and 500° C., and, more preferably still, comprised between 370° C. and 460° C., the favored temperature range lying between 380° C. and 440° C.

The H-oil type reactor (10) is designed with a suitable inlet pipe (12) for injecting a heavy hydrocarbon feedstock (11) and a gas (13) containing hydrogen. The outlet pipes are positioned in the upper part of the reactor (10). The outlet pipe (40) is designed to draw off vapors which may contain a certain quantity of liquid, and, as an option, the pipe (24) allows chiefly liquid to be drawn off. The reactor also contains a system allowing particles of catalyst to be introduced and drawn off, this system being indicated schematically by the pipe (15) for introducing fresh catalyst (16), and the pipe (17) for drawing off the spent catalyst (14).

The heavy hydrocarbon feedstock is introduced through the pipe (11), while the gas containing hydrogen is introduced through the pipe (13). The feedstock and gaseous hydrogen mixture is then introduced into the reactor (10) through the pipe (12) into the lower part of the reactor.

The incoming fluids pass through a plate (18) containing suitable distributors.

In this diagram, distributors of the "bubble cap" type (19) are shown, but it must be appreciated that any distributor known to those skilled in the art that allows the fluids coming from the pipe (12) to be distributed over the entire surface of the reactor (10), and do so as evenly as possible, can be used.

The liquid/gas mixture flows upward and the particles of catalyst are entrained in an ebullated bed movement by the flow of gas and the flow of liquid induced by the recirculation pump (20) which may be internal or external to the reactor (10).

The upflow of liquid delivered by the pump (20) is enough for the mass of catalyst in the reaction zone or catalytic bed (22) to expand by at least 10%, preferably from 20 to 100% with respect to the static volume (which is to say the volume it has at rest) of the catalyst bed, thus allowing the gas and liquid to flow through the reactor (10) as indicated by the direction arrows (21).

Because of the equilibrium between the friction forces generated by the upflow of the liquid and of the gas, and the forces of gravity directed downward, the bed of catalyst particles reaches an upper level of expansion while the liquid and the gas, which are lighter, continue to head toward the top of the reactor (10), beyond this solid level. In the diagram, the level of maximum expansion of the catalyst corresponds to the interface (23). Below this interface (23) is the catalytic reaction zone (22) which therefore extends from the grating (18) to the level (23).

Above the interface (23) is a zone (39) containing only gas and liquid. The particles of catalyst in the reaction zone (22) move randomly in a fluidized state, which is why the reaction zone (22) is qualified as a three-phase fluidized zone.

The zone (29) containing a low concentration of catalyst above the level (23) is filled with liquid and entrained gas. The gas is separated from the liquid in the upper part of the reactor referred to as the "recycle cup" (30) so as to collect and recycle the majority of the liquid through the central pipe (25). It is important for the liquid recycled through the central pipe (25) to contain the least possible amount of gas, or even no gas at all, so as to avoid the phenomenon of cavitation in the pump (20).

The liquid products that remain after the gas-liquid separation can be drawn off through the pipe (24). The pipe (40) is used for drawing off the gas.

The widened part at the upper end of the pipe (25) forms the liquid recycle zone 39V and 39L. A plurality of separation elements (27) and (28) oriented vertically create the connection between the gas-liquid zone (29) and the recycle zone (39).

The gas-liquid mixture flows upward through the pipes of the separation elements (27) and (28). Some of the separated liquid is then directed toward the recirculation pump (20) in the direction of the arrow (31) through the central pipe (25) and is therefore recycled to the lower part of the reactor (10) below the grating (18).

The gas separated from the liquid flows toward the upper part of the reactor (10) and is drawn off by the upper pipe (40). The gas drawn off is then treated in a conventional way to recover as much hydrogen as possible so that the latter is recycled to the reactor through the pipe (13).

The overall organization of the circulation of the fluids is unchanged in the present invention in comparison with the prior art such as has just been described. The only things modified are the geometry of the separation elements (27) and (28) and the dimensioning of the recycle zone (39).

FIG. 2 is a more accurate diagram of the recycle zone (39) depicted in FIG. 1.

The gas and the liquid flow upward as shown by the direction arrow (41) and are introduced through the inlet pipes (70) where they experience a direction change of around 90° in each instance in the first bend and in the second bend terminating the separation elements (27) and (28).

The level (24) separates the upper part (39 V) which predominantly contains the separated gas, from the lower part (39L) which predominantly contains the recycled liquid. The various separated liquids (45) emanating from the second bend of the elements (27) and (28) flow downward via the conical wall (30) and are collected by the central recycle pipe (25) to be picked up by the recirculation pump (20).

The majority of the liquid (31) is therefore recycled to the ebullition pump (20) through the central pipe (25). The gas and a minority of unseparated liquid (67) are drawn off through the pipe (40). The pipe (40) generally has slots (65) at its lower end to make it possible to fix the height of the liquid-gas interface (24).

FIG. 3 shows the geometry of a gas-liquid separation device according to the invention in greater detail and shows the key geometric dimensions for dimensioning said device.

The diameter of the inlet pipe (70) of each separation element (27) and (28) is generally comprised between 0.02 m and 0.5 m, preferably between 0.05 m and 0.4 m, and as a preference, between 0.1 m and 0.3 m.

The surface velocity of upflow liquid indicated by the direction arrow (41) is generally comprised between 0.1 and 20 m/s, preferably between 0.2 m/s and 15 m/s, and for preference, between 0.3 m/s and 10 m/s.

The first bend situated in the (yz) plane has its orientation defined by its angle $\alpha$. The value of the angle $\alpha$ is comprised between 45 and 315°, preferably between 60° and 300° and for preference, between 80° and 200°.

The second bend situated in the (xy) plane has its orientation defined by its angle $\beta$. The value of the angle $\beta$ is comprised between 0° and 135°, preferably between 10° and 110° and for preference, between 30° and 100°.

The height H1 comprised between the gas and liquid interface (24) and the second bend in the (xy) plane lies between D and 10D and preferably between 2D and 5D, D being the diameter of the pipe (70).

The distance D separating the two successive bends is comprised between D/2 and 4D and preferably comprised between D/2 and 2D, D being the diameter of the pipe (70).

EXAMPLE ACCORDING TO THE INVENTION

This example gives the dimensioning of a gas-liquid separation device according to the invention. The operating conditions for the process and the key geometric data for the device are given in table 1 below.

TABLE 1

Operating conditions of the recycle zone
and geometric parameters of the separator
Flow rates of the gas and liquid
phases entering the recycle zone

| Liquid | | |
|---|---|---|
| Flow rate | kg/s | 257.5 |
| Density | kg/m3 | 730.3 |
| Gas | | |
| Flow rate | kg/s | 12.9 |
| Density | kg/m3 | 32.6 |
| Number of separation devices according to the invention | | 35 |
| Diameter of each pipe (75) | | 15 cm |
| Angle alpha of the first bend | | 90° |
| Angle beta of the second bend | | 90° |

The gas efficiency is defined by equation 1 below. The flow numbers refer to FIG. 3.

$$\text{Gas\_efficiency} (\% \ m) = \frac{\text{Gas\_flow-rate}(67)}{\text{Gas\_flow-rate}(41)} \quad \text{Eq. 1}$$

Table 2 gives the gas efficiency obtained:

TABLE 2

| Separation efficiency | |
|---|---|
| Gas efficiency | 100% |

A 3D CFD simulation of the invention was performed using the Fluent™ software package.

A Eulerian approach was used for each phase (liquid and gas), with the solution of the equations of conservation of mass and momentum.

FIG. 4 shows the liquid fraction by volume in the separation device according to the invention, and in the recycle zone in its entirety, in varying shades of gray. The darker the shade of gray, the higher the liquid phase concentration. It may be seen that the device according to the invention achieves near-perfect separation of the gas and of the liquid found along the wall (50) in downflow. The gas fraction is found in the outlet nozzle (53).

The invention claimed is:

1. A gas-liquid separation device installed in a recycle zone of a three-phase fluidized reactor used in processes for hydroconversion of heavy hydrocarbon fractions in the presence of hydrogen under high pressure, the recycle zone (39) being made up of an upper hemisphere of the three-phase fluidized reactor and delimited in its lower part by a conical surface (30) allowing separated liquid to return to a catalytic zone, the gas-liquid separation device comprising a plurality of separation elements (27) and (28) operating in parallel and installed vertically from the conical surface (30) of the recycle zone (39), each separation element (27) and (28) having an inlet pipe (70) for admitting a gas-liquid mixture, open onto the conical surface (30) and rising to a height H inside the recycle zone (39), and ending in a succession of two bends: a first bend situated in the (zy) plane defined by a substantially vertical z-axis, and a y-axis belonging to the (xy) plane perpendicular to the z-axis, having its orientation defined by its angle $\alpha$ that is between 45 and 315°, and a second bend situated in the (xy) plane, the x-axis being itself perpendicular to the y-axis, having its orientation defined by its angle $\beta$ that is between 10° and 110°, the two successive bends being separated by a distance D1 that is between D/2 and 4D, D being the diameter of the inlet pipe (70).

2. The gas-liquid separation device as claimed in claim 1, in which a distance H1 separating the outlet end of the second bend situated in the (xy) plane from a gas-liquid interface (24) located in the recycle zone (39) is between D and 10D, D being the diameter of the inlet pipe (70).

3. The gas-liquid separation device as claimed in claim 1, in which the separation elements (27) and (28) have a density that is between 5 and 70 units per m$^2$ of empty barrel reactor surface area.

4. The gas-liquid separation device as claimed in claim 1, wherein the angle $\alpha$ is between 60° and 300°.

5. The gas-liquid separation device as claimed in claim 1, wherein the angle $\alpha$ is between 80° and 200°.

6. The gas-liquid separation device as claimed in claim 1, wherein the angle $\beta$ is 90°.

7. The gas-liquid separation device as claimed in claim 1, wherein the angle $\beta$ is between 30° and 100°.

8. The gas-liquid separation device as claimed in claim 1, wherein the distance D1 is between D/2 and 2D, D being the diameter of the inlet pipe (70).

9. The gas-liquid separation device as claimed in claim 1, in which a distance H1 separating the outlet end of the second bend situated in the (xy) plane from a gas-liquid interface (24) located in the recycle zone (39) is between 2D and 5D, D being the diameter of the inlet pipe (70).

10. The gas-liquid separation device as claimed in claim 1, wherein the gas-liquid separation device consists of the plurality of separation elements (27) and (28).

11. The gas-liquid separation device as claimed in claim 1, wherein the angle $\alpha$ is between 80° and 200°, the angle $\beta$ is between 30° and 100°, the distance D1 is between D/2 and 2D, and a distance H1 separating the outlet end of the second bend situated in the (xy) plane from a gas-liquid interface (24) located in the recycle zone (39) is between 2D and 5D, D being the diameter of the inlet pipe (70).

12. A process for a three-phase fluidized bed hydroconversion of heavy hydrocarbon fractions using the three-phase fluidized reactor comprising the gas-liquid separation device installed in the recycle zone as recited in claim 1, in which operating conditions of the three-phase fluidized reactor are as follows:
   a pressure between 2 and 35 MPa absolute, and
   a temperature between 300° C. and 550° C.

13. The process according to claim 12, wherein the pressure is between 5 and 25 MPa.

14. The process according to claim 12, wherein the pressure is between 6 and 20 MPa absolute.

15. The process according to claim 12, wherein the temperature is between 350° C. and 500° C.

16. The process according to claim 12, wherein the temperature is between 370° C. and 430° C.

17. The process according to claim 12, wherein the temperature is between 380° C. and 430° C.

18. A process for a three-phase fluidized bed hydroconversion of heavy hydrocarbon fractions using the three-phase fluidized reactor comprising the gas-liquid separation device installed in the recycle zone as recited in claim 1, in which a surface velocity of upflow considered inside each inlet pipe (70) is between to 0.1 and 20 m/s.

19. The process according to claim 18, wherein the surface velocity is between to 0.2 and 15 m/s.

20. The process according to claim 18, wherein the surface velocity is between to 0.3 and 10 m/s.

* * * * *